Patented Aug. 31, 1965

3,203,985
POLYMERIC PRODUCTS PREPARED BY THE REACTION OF DIISOCYANATES AND BIS AMINO DECABORANES
Marvin M. Fein, Westfield, N.J., and Barney Grofen, West Lafayette, Ind., assignors to Thiokol Chemical Corporation, Bristol, Pa., a corporation of Delaware
No Drawing. Filed Nov. 15, 1960, Ser. No. 69,519
10 Claims. (Cl. 260—553)

This invention relates to organoboron copolymers and to a method for their preparation.

The organoboron copolymers are prepared by reaction of a diisocyanate with a bis(diamino) decaborane or a bis(diamino) alkyldecaborane.

The preparation of decaborane is known in the art. Lower alkyl decaboranes such as monomethyldecaborane, dimethyldecaborane, monoethyldecaborane, diethyldecaborane, monopropyldecaborane, and the like, can be prepared, for example, according to the method described in application Serial No. 497,407, filed March 28, 1955, now U.S. Patent No. 2,999,117, by Elmar R. Altwicker, Alfred B. Garrett, Samuel W. Harris, and Earl A. Weilmuenster.

Bis(diamino)alkyldecaboranes can be prepared by reacting a lower alkyldecaborane and a diamine at a temperature of 80° to 150° C. with hydrogen evolution according to the method described in copending application Serial No. 695,179, filed November 7, 1957, of Joseph Green et al. Bis(diamino) decaboranes can similarly be prepared by reacting decaborane and a diamine at a temperature of 80° to 150° C. with hydrogen evolution.

Suitable diisoycanates include those of the general formula

O=C=N—R—N=C=O where R is a lower alkylene, a cycloalkyl or an aromatic radical, such as hexamethylene diisocyanate, cyclohexyl diisocyanate, 2,4-tolylene diisocyanate, 1,5-naphthalene diisocyanate, 3,3'-bitolylene-4,4'-diisocyanate, diphenylmethane - 4,4' - diisocyanate, and 3,3'-dimethyldiphenylmethane-4,4'-diisocyanate.

The ratio of reactants can be varied widely, generally being in the range 10:1 to 1:3 moles of the borane per mole of diisocyanate, preferably 2:1 to 1:1. The reaction temperature can vary from 25 to 200° C. and the pressure can vary from subatmospheric to several atmospheres. The reaction to go to completion generally requires from 1 to 48 hours, depending upon the ratio of reactants, the particular reactants utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as dioxane, ethyl acetate, and diisopropyl ether. The amount of solvent can vary widely but generally ranges up to about 70 times the weight of the reactants. When a solvent is employed, it is preferred to carry out the reaction at the reflux temperature of the solvent.

The process of the invention is illustrated in detail by the following examples:

*Example I*

Bis(ethylenediamino)decaborane was prepared as follows: A 500 milliliter glass flask was equipped with a magnetic stirrer, thermometer and dropping funnel with a bypass. To the flask was also connected a reflux condenser with a drying tube leading to a wet test meter and to a gas collecting system. To this flask containing 100 milliliters of benzene at room temperature, 6.1 grams (0.05 mole) of decaborane and 6.0 grams (0.1 mole) of ethylenediamine were added simultaneously over a period of 1.5 hours. The reaction mixture was then heated and maintained at benzene reflux temperature (80° C.) for 24 hours, during which time it was observed that a gas, later analyzed as hydrogen, evolved. The benzene was then separated from the white solid which formed in the flask by evaporation at a vacuum of $10^{-2}$ millimeters of mercury. About 11.5 grams of a white solid remained. An infrared spectrum of the white solid indicated a 2 amine:1 decaborane covalently linked compound, bis(ethylenediamino)decaborane.

6.0 grams (0.025 mole) of the bis(ethylenediamino) decaborane were heated for 20 hours at 50° C. as a slurry in an excess, i.e., 16.8 grams (0.1 mole), of hexamethylene-diisocyanate. Separation and purification of the solids gave 6.65 grams of a yellow-white powder having a melting point of 145°–150° C. (d.). The melting point of the original bis(ethylenediamino) decaborane was 93°–96° C. (d.). The stoichiometry of the reaction indicates that the product consists of bis(ethylenediamino)-decaborane and hexamethylene-diisocyanate in a molar ratio of 6.4:1. An infrared spectrum of the product was consistent with

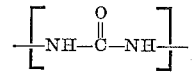

linkages resulting from an amine-isocyanate interaction.

*Example II*

Bis(1,3-diaminobutane)decaborane was prepared from decaborane and 1,3-diaminobutane in a manner similar to that in which bis(ethylenediamino)decaborane was prepared in Example I.

5.7 grams (0.019 mole) of the bis(1,3-diaminobutane) decaborane so prepared was slurried in an excess, i.e., 16.8 grams (0.1 mole), of hexamethylenediisocyanate to which 25 milliliters of cyclohexane had been added as a diluent. The mixture was refluxed for 80 hours and 6.8 grams of yellow-white solids were recovered. The solids had a melting point higher than 300° C. The melting point of the original bis(1,3-diaminobutane)decaborane was 171°–174° C. (d.). The stoichiometry of the reaction indicates that the product consists of bis(1,3-diaminobutane)decaborane and hexamethylenediisocyanate in a molar ratio of 2.9:1. Again an infrared spectrum of the product was consistent with

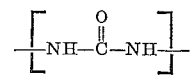

linkages resulting from an amine-isocyanate interaction.

The boron containing solid materials produced by practicing the methods of this invention, can be employed as ingredients of solid propellant compositions in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

We claim:

1. A process for the preparation of solid polymeric reaction products of a borane and a diisocyanate which comprises reacting a borane selected from the class consisting of a bis(diamino) decaborane and a bis(diamino) alkyldecaborane with a diisocyanate of the formula $$O=C=N-R-N=C=O$$

wherein R is a radical selected from the class consisting of alkylene, cycloalkyl, unsubstituted aromatic radicals and hydrocarbon substituted aromatic radicals.

2. The process of claim 1 wherein the reactants are in admixture with a solvent inert with respect to the reactants.

3. The process of claim 1 wherein the borane is bis-(ethylenediamino)decaborane.

4. The process of claim 1 wherein the borane is bis-(1,3-diaminobutane)decaborane.

5. The process of claim 1 wherein the diisocyanate is hexamethylenediisocyanate.

6. The process of claim 1 wherein the borane is bis-(ethylenediamine)decaborane and wherein the diisocyanate is hexamethylenediisocyanate.

7. The process of claim 2 wherein the borane is bis-(1,3-diaminobutane)decaborane, wherein the diisocyanate is hexamethylenediisocyanate, and wherein the solvent is cyclohexane.

8. Solid products produced according to the process of claim 1.

9. Solid products produced according to the process of claim 6.

10. Solid products produced according to the process of claim 7.

No references cited.

NICHOLAS S. RIZZO, *Primary Examiner.*

LEON D. ROSDOL, ROGER L. CAMPBELL,
*Examiners.*